Aug. 15, 1939. J. VENOLIA 2,169,775
POULTRY NEST
Filed July 13, 1937
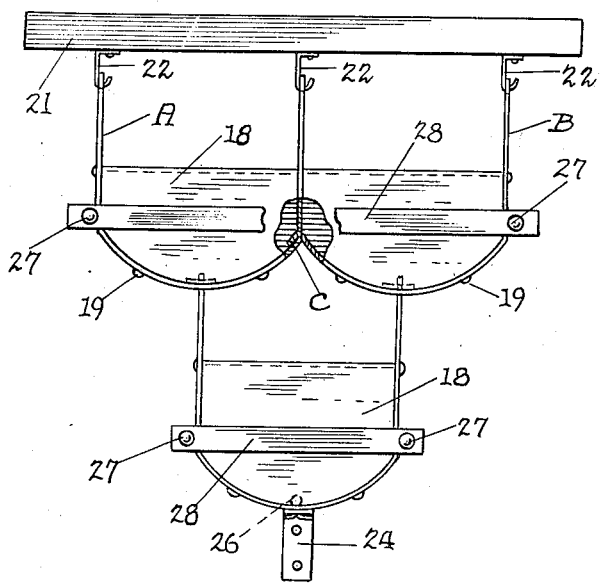
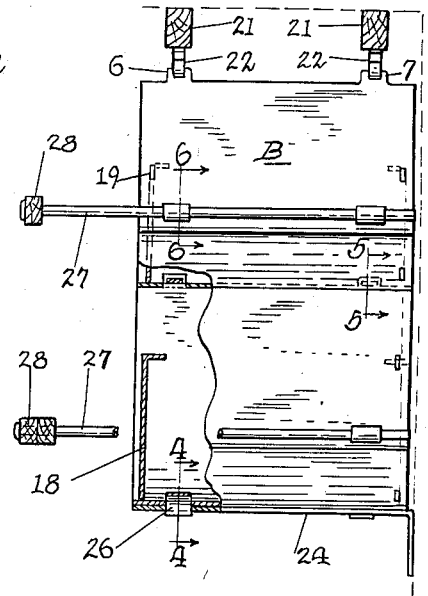
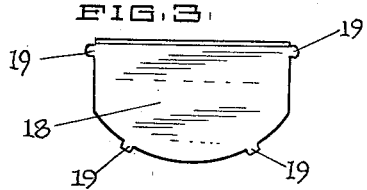
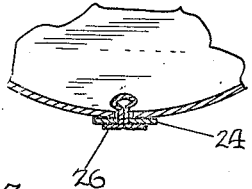
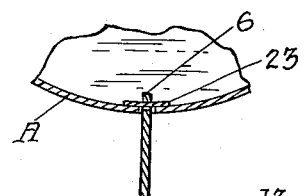
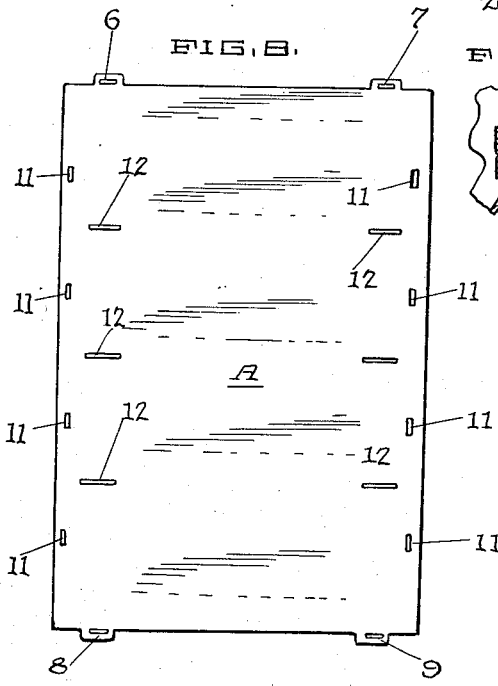
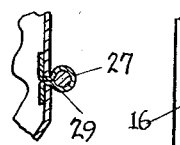
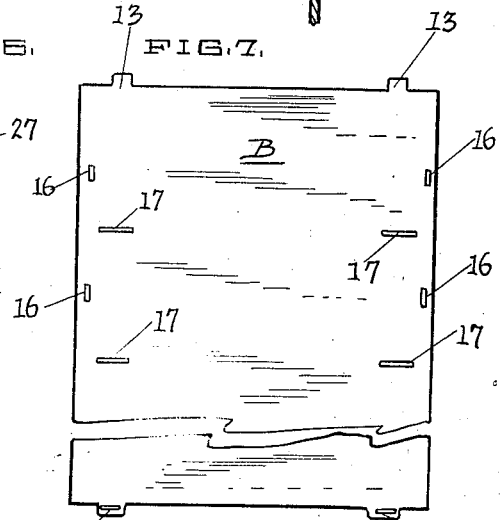
INVENTOR.
JOSEPH VENOLIA.
BY *Victor J Evans Co*
ATTORNEYS.

Patented Aug. 15, 1939

2,169,775

UNITED STATES PATENT OFFICE 2,169,775

POULTRY NEST

Joseph Venolia, Spadra, Calif.

Application July 13, 1937, Serial No. 153,388

2 Claims. (Cl. 119—45)

This invention relates to improvements in poultry nests, and has particular reference to a poultry nest which will occupy a minimum amount of space, one which may be readily secured to side walls or hung from overhead supports, a nest which will be sanitary, easily cleaned, and one which is economical to construct.

A further object is to produce a device of this character which may be shipped flat and readily assembled, thereby saving in transportation space.

Other objects and advantages will be apparent during the course of the following description.

In the accompanying drawing forming a part of this specification and in which like numerals are employed to designate like parts throughout the same, Fig. 1 is a front elevation of several nests combined;

Fig. 2 is a side elevation partly in cross section of Fig. 1;

Fig. 3 is a plan view of one of the end plates;

Fig. 4 is an enlarged cross sectional view taken on the line 4—4 of Fig. 2;

Fig. 5 is an enlarged detail cross sectional view taken on the line 5—5 of Fig. 2;

Fig. 6 is an enlarged detail cross sectional view taken on the line 6—6 of Fig. 2;

Fig. 7 is a plan view of the auxiliary nest blank; and

Fig. 8 is a plan view of the main nest blank.

It is my intention to form nests for fowl out of blanks which may be connected one to the other, and in any number of nests desired depending upon the space available and the demands. This I accomplish by employing a main blank, as shown in Fig. 8, having perforated projections 6, 7, 8 and 9 formed in its ends, and openings 11 punched along the side margins, transverse slots 12 are also punched in the blank, the purpose of which will be later seen. The auxiliary blank shown in Fig. 7 is provided with extensions 13 on one end and perforated extensions 14 shown at its opposite end. This blank is also provided with perforations 16 along its side which correspond to the perforations 11. Perforations 17 are also provided which correspond to the perforations 12. End pieces 18 have projections 19 formed thereon, the purpose of which will be later seen.

In forming my nests, I first bend the main blank A into the shape shown in Fig. 1, and then place end pieces 18 at each end of the curved blank and in such a manner that the projections 19 will pass through the perforations 11. The nest thus formed may be hung from an overhead support 21, through the medium of hooks 22 engaging the perforated projections 6, 7, 8 and 9. If it is desired to add other nests, the auxiliary blank is bent, as shown in Fig. 1, and the projections 13 are passed through two of the perforations 12 and be bent over, as indicated at C. End pieces 18 are also inserted in place, thus completing two nests. Other nests may be added in succession as desired. Below the nest thus formed may be suspended a third nest, which third nest is formed from a main blank and is supported from the nests formed by the blanks A and B, by placing the projections 6, 7, 8 and 9 of this lowermost nest through the perforations 12 and 17 in the bottom of the nests formed by the blanks A and B, then inserting a pin 23 through the perforation in each projection, as is obvious by viewing Fig. 5, and finally end pieces 18 are also inserted to complete the lowermost nest. I may use a bracket 24 for supporting the nests and which is fastened to the bottom of the lowermost nest by a bent clip 26, as shown in Fig. 4. Perch rods 27 supporting perches 28 may be secured to the sides of the nest by clips 29 as shown in Fig. 6.

Thus it will be seen that I have provided means for simply constructing a plurality of nests of flat metal, which nests will perform all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claims.

Having thus described my invention, I claim:

1. A poultry nest formed of a blank having projections at each end thereof, spaced openings formed along its side margin, transverse slots formed in said blank, whereby end pieces having projections formed thereon will engage the openings formed in said blank when said blank is bent to assume an arcuate shape, said end projections forming support engaging connections, a second blank having projections formed thereon, said second blank being bent to form a side and a bottom of a nest, some of the projections of said second-mentioned blank entering certain of said transverse slots in said first-mentioned blank, and end pieces secured to said second-mentioned blank to form a nest.

2. A poultry nest formed of a blank having projections at each end thereof, spaced openings formed along its side margin, transverse slots formed in said blank, whereby end pieces having projections formed thereon will engage the openings formed in said blank when said blank is bent to assume an arcuate shape, said end projections forming support engaging connections, a second blank having projections formed thereon and transverse slots formed therein, said second blank being bent to form a side and a bottom of a nest, some of the projections of said second-mentioned blank entering certain of said transverse slots in said first-mentioned blank, end pieces secured to said second-mentioned blank to form a nest, perch rods secured to said blanks through the medium of some of said transverse slots, and a perch carried by said perch rods.

JOSEPH VENOLIA.